(12) United States Patent
Langhals et al.

(10) Patent No.: US 11,326,057 B2
(45) Date of Patent: *May 10, 2022

(54) AUTOMATIC SORTING OF POLYMER MATERIALS ON THE BASIS OF THE FLUORESCENCE DECAY TIME OF THE INTRINSIC FLUORESCENCE OF THE POLYMER

(71) Applicant: Unisensor Sensorsysteme GmbH, Karlsruhe (DE)

(72) Inventors: Heinz Langhals, Ottobrunn (DE); Thorben Schlücker, Ottobrunn (DE); Dominik Zgela, Munich (DE)

(*) Notice: Subject to any disclaimer, the term of this patent is extended or adjusted under 35 U.S.C. 154(b) by 198 days.

This patent is subject to a terminal disclaimer.

(21) Appl. No.: 15/129,408

(22) PCT Filed: Mar. 4, 2015

(86) PCT No.: PCT/DE2015/000102
§ 371 (c)(1),
(2) Date: Sep. 26, 2016

(87) PCT Pub. No.: WO2015/144114
PCT Pub. Date: Oct. 1, 2015

(65) Prior Publication Data
US 2017/0210901 A1    Jul. 27, 2017

(30) Foreign Application Priority Data
Mar. 27, 2014   (DE) .................. 10 2014 004 529.3

(51) Int. Cl.
*G01N 21/64*    (2006.01)
*B07C 5/342*    (2006.01)
(Continued)

(52) U.S. Cl.
CPC ................ *C09B 3/14* (2013.01); *B07C 5/342* (2013.01); *B29B 17/02* (2013.01); *C08J 11/06* (2013.01);
(Continued)

(58) Field of Classification Search
CPC ............ B29B 17/02; B29B 2017/0203; B29B 2017/0279; Y02W 30/62; Y02W 30/622;
(Continued)

(56) References Cited

U.S. PATENT DOCUMENTS 4,212,397 A * 7/1980 Bockelmann ........... B07C 5/346
378/47
4,259,574 A * 3/1981 Carr .................... G01N 21/6408
250/302
(Continued)

FOREIGN PATENT DOCUMENTS

DE    4210970 A1    10/1993
DE    4231477 A1    3/1994
(Continued)

OTHER PUBLICATIONS

Chia, T.H. et al. "Detection of counterfeit U.S. paper money using intrinsic fluorescence lifetime," Optics Express, Nov. 23, 2009, vol. 17, No. 24, 22054-22061 (Year: 2009).*
(Continued)

*Primary Examiner* — Jennifer Wecker
*Assistant Examiner* — Michelle Adams
(74) *Attorney, Agent, or Firm* — Jon L. Woodard; Woodard International Law

(57) ABSTRACT

The invention relates to the identification of polymer materials on the basis of the fluorescence decay time of the intrinsic fluorescence of the polymer materials for definite sorting in a completely separated manner. The invention further relates to marking with fluorescent dyes, which,
(Continued)

because of the specific fluorescence decay times of the fluorescent dyes, can further increase the sorting reliability by means of redundancy and can be used to identify particular batches.

7 Claims, 15 Drawing Sheets

(51) Int. Cl.
| | |
|---|---|
| B29B 17/02 | (2006.01) |
| C09B 3/14 | (2006.01) |
| C09B 5/62 | (2006.01) |
| C08K 5/3437 | (2006.01) |
| C08J 11/06 | (2006.01) |

(52) U.S. Cl.
CPC ............. *C08K 5/3437* (2013.01); *C09B 5/62* (2013.01); *G01N 21/6408* (2013.01); *B29B 2017/0203* (2013.01); *B29B 2017/0279* (2013.01); *C08J 2400/22* (2013.01); *C08J 2400/30* (2013.01); *G01N 2021/6439* (2013.01); *Y02W 30/62* (2015.05)

(58) Field of Classification Search
CPC ........ C08J 11/04; C08J 11/06; C08J 2400/30; G01N 21/6408; G07D 5/00; G07D 7/00; G07D 7/06; G07D 7/12; G07D 7/1205; G07D 7/121; B07C 5/00; B07C 5/342; B07C 5/3427
USPC .......................... 209/522–534, 576–579, 589
See application file for complete search history.

(56) References Cited

U.S. PATENT DOCUMENTS

| | | | | | |
|---|---|---|---|---|---|
| 5,256,880 | A | * | 10/1993 | Loree | G01N 33/442 |
| | | | | | 250/461.1 |
| 5,314,072 | A | * | 5/1994 | Frankel | B07C 5/3408 |
| | | | | | 209/44.1 |
| 5,329,127 | A | * | 7/1994 | Becker | B07C 5/3427 |
| | | | | | 235/491 |
| 5,459,313 | A | * | 10/1995 | Schrader | G01N 21/9081 |
| | | | | | 250/223 B |
| 10,533,943 | B2 | * | 1/2020 | Krieg | B07C 5/3412 |
| 2005/0095715 | A1 | | 5/2005 | Hubbard et al. | |

FOREIGN PATENT DOCUMENTS

| | | |
|---|---|---|
| DE | 102004024754 B3 | 4/2006 |
| DE | 102007055765 A1 | 6/2009 |
| DE | 102012012772 A1 | 12/2013 |
| DE | 102012014982 A1 | 2/2014 |
| WO | WO2005054830 A1 | 6/2005 |

OTHER PUBLICATIONS

Fomin, P. et al. "Investigation of fluorescence spectra disturbances influencing the classification performance of fluorescently labeled plastic flakes," Proceedings of the SPIE, vol. 8791, id. 87911J, 15 pp. (Year: 2013).*

Royal Society of Chemistry, "Textile conservation—the structure of cotton and linen," Index 3.3.2 (5 pages), downloaded from the internet at <https://www.rsc.org/Education/Teachers/Resources/Inspirational/resources/3.3.2.pdf> on Aug. 5, 2019. (Year: 2019).*

Htun, T. et al. "Laser-induced fluorescence decays of polyethylene films," Journal of Luminescence 130 (2010) 1275-1279 (Year: 2010).*

Comelli, D. et al. "Fluorescence lifetime imaging and spectroscopy as tools for nondestructive analysis of works of art," Applied Optics vol. 43, Issue 10, pp. 2175-2183 (2004) (Year: 2004).*

Borgia, I. et al. "Luminescence from pigments and resins for oil paintings induced by laser excitation," Applied Surface Science 127-129 (1998) 95-100 (Year: 1998).*

Nevin, A. et al. "Excitation emission and time-resolved fluorescence spectroscopy of selected varnishes used in historical musical instruments," Talanta 80 (2009) 286-293 (Year: 2009).*

Bai Y.L. et al. "RMB identification using the polar phasor approach on the time-resolved fluorescence," SCIENTIA SINICA Physica, Mechanica & Astronomica, vol. 43 , Issue 6 : 718-724 (2013); including software translation (Year: 2013).*

Langhals, H. et al. "High Performance Recycling of Polymers by Means of Their Fluorescence Lifetimes," Green and Sustainable Chemistry vol. 04 No. 03 (2014), Article ID:48915, 6 pages; Published Online Aug. 2014. (Year: 2014).*

Langhals, H. "Sauber recycliert," Nachrichten aus der Chemie, Jan. 2015, vol. 63, Issue 1, 23-25; including software translation. (Year: 2015).*

Ludwig Maximilian University of Munich, "The fluorescent fingerprint of plastics," Aug. 21, 2014, retrieved Aug. 6, 2020 from https://phys.org/news/2014-08-fluorescent-fingerprint-plastics.html (Year: 2014).*

Nemeth, Erno, et al. "Triboelectric Charging of Mixed Plastics," Aufbereitungs Technik 46 Nr. 1-2 (2005).

Langhals, Heinz, et al. "Binary Fluorescence Labeling for the Recovery of Polymeric Materials for Recycling," Int'l J. Env. Eng. Sci. & Tech Res. vol. 1, No. 7 (Jul. 2013).

Ballew, Richard M. et al. "An Error Analysis of the Rapid Lifetime Determination Method for the Evaluation of Single Exponential Decays," Anal. Chem. 61 (1989).

Woods, R.J. "Transient Digitizer for the Determination of Microsecond Luminescence Lifetimes," Anal. Chem. 56 (1984).

Meier, Robert J., et al. "Referenced Luminescent Sensing and Imaging with Digital Color Cameras: A Comparative Study," Sensors and Actuators B: Chemical (2013).

Alibert-Fouet, Sonia, et al. "Liquid-Crystalline and Electron-Deficient Coronene Oligocarboxylic Esters and Imides," Chem. Eur. J. 13 (2007).

Demming, S., et al. "Leichtlosliche, Lichtechte Perylen-Fluoreszenzfarbstoffe," Chem. Ber. 121 (1988).

Langhals, Heinz, et al. "Core-Extended Terrylenetetracarboxdiimides—Novel, Strongly Red Fluorescent Broadband Absorbers," Eur. J. Org. Chem (2008).

Langhals, Heinz, et al. "A Versatile Standard for Bathochromic Fluorescence Based on Intramolecular FRET," Phys. Chem. Chem. Phys. 13 (2011).

* cited by examiner

AUTOMATIC SORTING OF POLYMER MATERIALS ON THE BASIS OF THE FLUORESCENCE DECAY TIME OF THE INTRINSIC FLUORESCENCE OF THE POLYMER

BACKGROUND

Organic polymer materials are technical mass products, the recycling of which is getting more and more important and interesting. Due to the unregulated disposal of such materials environmental problems have been caused to an increasing degree ("plastic planet"). Furthermore recycling of polymer materials is a valuable source for organic raw materials. The predominant part of the technically used macro-molecular materials are thermoplastics, which can be reused basically by fusion and new forming; this requires however due to the incompatibility of polymeric materials among each other a high degree of sorting pureness, since already 5% contaminant deteriorates the properties to large degree. Used materials are however provided in the rarest cases in a completely separated manner, at best as waste during production processes; collected material is in general more or less mixed and has to, in particular prior to the converting to high-quality products, be sorted. A sorting is also interesting when re-used in a different way, because the corresponding processes can be exactly adjusted to the respective materials. The sorting for recycling requires a fast, efficient and less-complex detection method. There are known detection methods, which are based on the different density or on the electrostatic properties [1] of macro-molecular materials; Such methods are basically complex and accident-sensitive.

Optical methods are attractive, because they are fast and reliable and require only a comparatively small effort. The marking of polymer materials with fluorescence dyes has been described [2], to identify the respective material or the respective charge respectively using fluorescence spectra (wavelength-dependency of the fluorescence intensity) [3,4]. This method requires registering and assigning of fluorescence spectra individually for each polymer particle and is therefore basically comparatively complex. Furthermore the polymeric materials must be already marked for their sorting; this limits the method to a selective recycling. It is in particular basically unfeasible for secondary materials. It would be desirable if a sorting method could be provided also for unmarked material and therefore the complex registering of fluorescence spectra could be avoided.

SUMMARY OF THE INVENTION

The invention provides optical detection to Identify polymer raw materials in a completely separated manner. The invention includes:
a. Use of the individual fluorescence decay times of the intrinsic fluorescence (autofluorescence) of polymers for their detection, preferably for their detection for sorting in a completely separated manner for recycling.
b. Use of perylenetetracarboxylicbisimides of the general formula 4

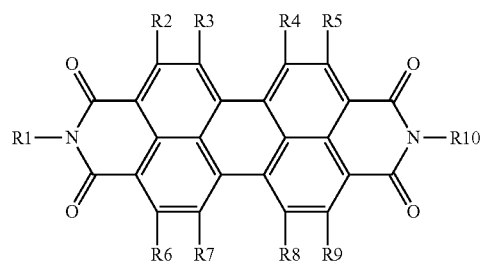

for fluorescence coding of macro-molecular substances for their clear identification via the fluorescence decay time, wherein the moieties $R^1$ to $R^{18}$ can be identical or different from each other and can mean independently from each other hydrogen or linear alkyl moieties with at least one and at most 37 C-atoms, in which 1 up to 10 $CH_2$-Units independently of each other can be each replaced by carbonylgroups, oxygen atoms, sulfur atoms, selenium atoms, tellurium atoms, cis- or trans-CH=CH— groups, in which a CH-unit can also be replaced by a Nitrogen atom, acetylenic C≡C-Groups 1,2-1,3- or 1,4-substituted phenyl moieties, 2, 3-, 2,4-, 2,5-, 2,6-, 3,4- or 3,5-disubstituted pyridine moieties, 2,3-, 2,4-, 2,5- or 3,4-disubstituted thiophene moieties, 1,2-, 1,3-, 1,4-, 1,5-, 1,6-, 1,7-, 1,8-, 2,3-, 2,6-, or 2,7-disubstituted naphthaline moieties, in which one or two CH-groups may be replaced by nitrogen atoms, 1,2-, 1,3-, 1,4-, 1,5-, 1,6-, 1,7-, 1,8-, 1,9-, 1,10-, 2,3-, 2,6-, 2,7-, 2,9-, 2,10- or 9,10-disubstituted anthracene moieties, in which one or two CH-groups may be replaced by nitrogen atoms. Up to 12 single hydrogen atoms of the $CH_2$-groups can be independently of each other replaced also on same C-atoms by the halogens fluorine, chlorine, bromine or iodine or the cyano-group or a linear alkylchain with up to 18 C-atoms, in which one up to six $CH_2$-units can be independently being replaced by carbonylgroups, oxygen atoms, sulfur atoms, selenium atoms, tellurium atoms, cis- or trans-CH=CH-groups, in which a CH unit can also be replaced by a Nitrogen atom, acetylenic C≡C-groups 1,2-1,3- or 1,4-substituted phenyl moieties, 2,3-, 2,4-, 2,5-, 2,6-, 3,4- or 3,5-disubstituted pyridine moieties, 2,3-, 2,4-, 2,5- or 3,4-disubstituted thiophene moieties, 1,2-, 1,3-, 1,4-, 1,5-, 1,6-, 1,7-, 1,8-, 2,3-, 2,6-, or 2,7-disubstituted naphthaline moieties, in which one or two carbon atoms may be replaced by nitrogen atoms, 1,2-, 1,3-, 1,4-, 1,5-, 1,6-, 1,7-, 1,8-, 1,9-, 1,10-, 2,3-, 2,6-, 2,7-, 2,9-, 2,10- or 9,10-disubstituted anthracene moieties, in which in which one or two carbon atoms may be replaced by nitrogen atoms. Up to 12 single hydrogen atoms of the $CH_2$-groups of the alkyl moieties can each be independently of each other replaced also on same C-atoms by the halogens fluorine, chlorine, bromine or iodine or cyano-groups or linear alkylchains with up to 18 C-atoms, in which one up to six $CH_2$-units can be independently of each other being replaced by carbonylgroups, oxygen atoms, sulfur atoms, selenium atoms, tellurium atoms, cis- or trans-CH=CH-groups, in which a CH-unit can be replaced by a Nitrogen atom, acetylenic C≡C-Groups 1,2-1,3- or 1,4-substituted phenyl moieties, 2,3-, 2,4-, 2,5-, 2,6-, 3,4- or 3,5-disubstituted pyridine moieties, 2,3-, 2,4-, 2,5- or 3,4-disubstituted thiophene moieties, 1,2-, 1,3-, 1,4-, 1,5-, 1,6-, 1,7-, 1,8-, 2,3-, 2,6-, or 2,7-disubstituted naphthaline moieties, in which one or two carbon atoms may be replaced by nitrogen atoms, 1,2-, 1,3-, 1,4-, 1,5-, 1,6-, 1,7-, 1,8-, 1,9-, 1,10-, 2,3-, 2,6-, 2,7-, 2,9-, 2,10- or 9,10-disubstituted anthracene moieties, in which one or two carbon atoms may be replaced by nitrogen atoms. Instead of carrying substituents the free valences of the methine group or the quaternary C-atoms respectively can by pairwise connected to form rings like cyclohexane rings. The moieties $R^1$ to $R^9$ can furthermore independently of each other mean halogene atoms F, Cl, Br, I.

c. Use of terrylenetetracarboxylicbisimides of the general formula 5

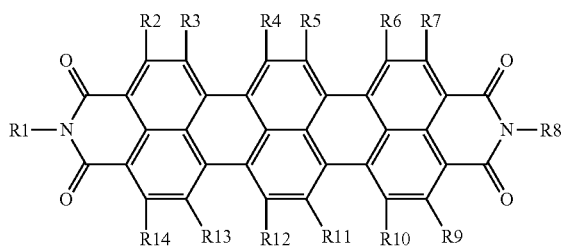

5 for fluorescence coding via the fluorescence decay time, wherein the moieties $R^1$ to $R^4$ have the meaning according to 2.

d. Use of perylenetetracarboxylic derivatives of the general formula 6

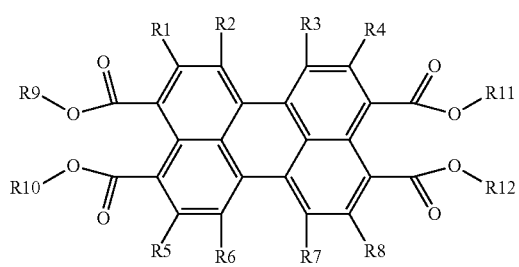

6 for fluorescence coding via the fluorescence decay time, wherein the moieties $R^1$ to $R^{12}$ have the meaning according to 2.

e. Method characterized in that the perylene derivatives according to b. to d. in small concentration are brought into the polymer materials and are detected via their fluorescence decay time; preferable concentrations lie between 1 ppb and 100 ppm, most preferably are concentrations between 1 and 100 ppb.

f. Method characterized in that for fluorescence stimulation according to a. to d. pulsed light sources are used; preferred light sources are semiconductor light sources like laser diodes and light diodes, preferably comprising gallium nitride, or also gas discharge lamps.

g. Method characterized in that the detection according to a. to d. is performed using phase-sensitive detectors.

h. Use of the fluorescence decay time according to a. for detecting of polymer materials characterized in that for stimulating the fluorescence periodic pulsed light sources are used and that the fluorescence signal is accumulated and averaged.

i. Use of the fluorescence decay time according to b. to d. for coding of polymer materials characterized in that for stimulating fluorescence periodic pulsed light sources are used and that the fluorescence signal is accumulated and averaged.

j. Use of the fluorescence decay time according to a. for detection of polymer materials for correctly sorted separation for the purpose of recycling; preferred polymeric materials are thermoplastics, and among these in particular preferred polyoxymethylene (POM), polystyrene (PS), polyamide (PA), polyethylene terephthalate (PET), polycarbonates (PC), polyethylene (PE), polypropylene (PP), polyvinyl chloride (PVC), polyEtherKetone (PEK) or also aramides, KAPTON® (polyimide), polysulfone.

k. Use of the fluorescent decay time according to b. to d. for coding of polymer materials for correctly sorted separation for the purpose of recycling; preferred polymeric materials are thermoplastics, And under these in particular preferred polyoxymethylene (POM), Polystyrene (PS), polyamide (PA), Polyethylene terephthalate (PET), Polycarbonates (PC), polyethylene (PE), polypropylene (PP), Polyvinyl chloride (PVC), PolyEtherKetone (PEK) or also aramides, KAPTON® (polyimide), Polysulfone.

l. Use of the fluorescence decay time according to b. to d. for coding of polymer materials for their recognition of objects for their clear identification, also in the sense of product counterfeiting.

BRIEF DESCRIPTION OF THE DRAWINGS

FIG. 7. Fluorescence decay behavior of the ester 1 in Luran; fluorescence stimulation at 490 mm, detection at 573 nm. Dotted line: time-dependent intensity curve of the stimulation lamb. Solid, noisy curve: Time curve of the intrinsic fluorescence with deconvoluted function as Balancing curve (mostly covered by the Measured curve). On the right side: Detail of the fluorescence decay curve and balancing function with logarithmic scale.

Figure 8:
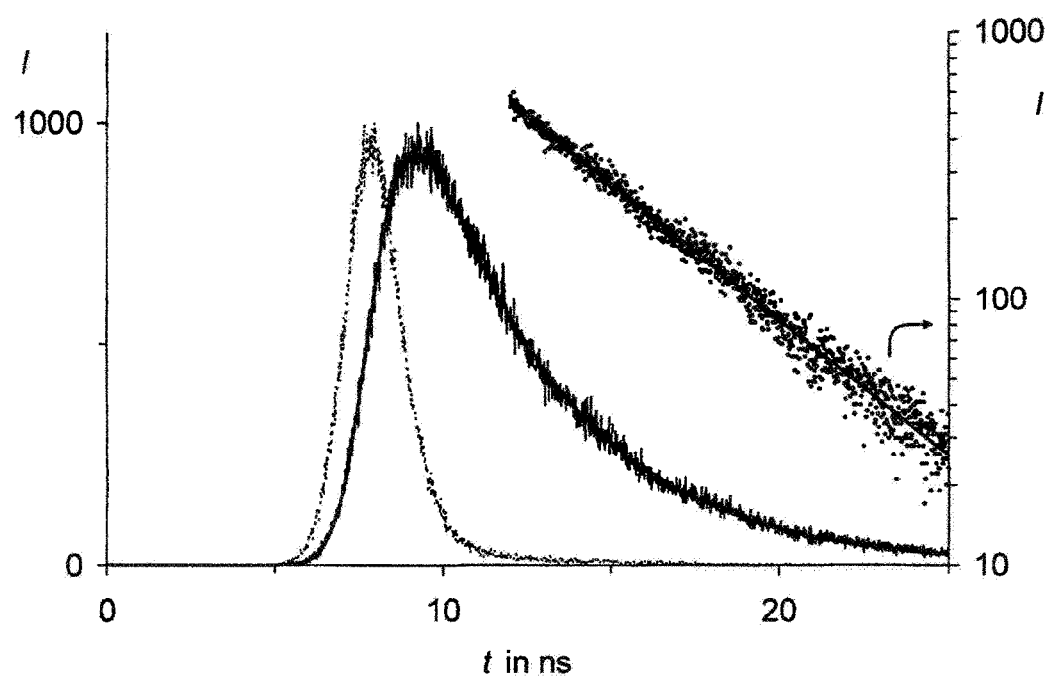

FIG. 8. Fluorescence decay behavior of the ester 1 in Delrin; fluorescence stimulation at 490 mm, detection at 573 nm. Dotted line: time-dependent intensity curve of the stimulation lamb. Solid, noisy curve: Time curve of the intrinsic fluorescence with deconvoluted function as Balancing curve (mostly covered by the Measured curve). On the right side: Detail of the fluorescence decay curve and balancing function with logarithmic scale.

Figure 9:
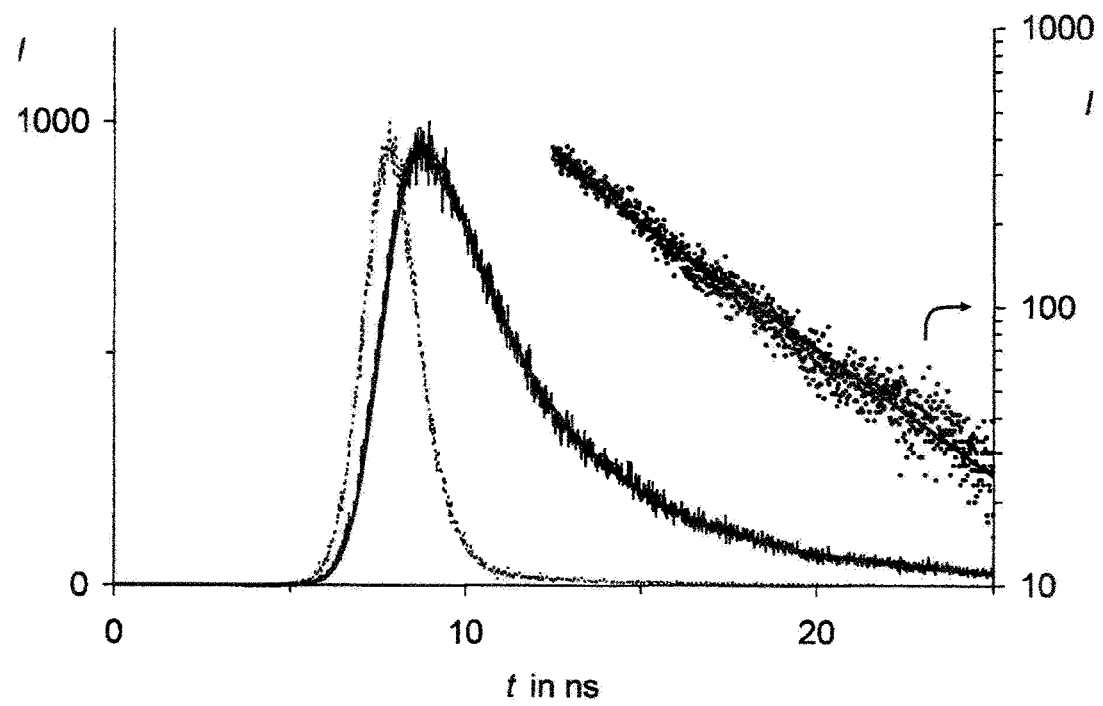

FIG. 9. Fluorescence decay behavior of the ester 1 in Ultramid; fluorescence stimulation at 490 mm, detection at 573 mu. Dotted line: time-dependent intensity curve of the stimulation lamb.

Solid, noisy curve: Time curve of the intrinsic fluorescence with deconvoluted function as Balancing curve (mostly covered by the Measured curve). On the right side: Detail of the fluorescence decay curve and balancing function with logarithmic scale.

Figure 10:
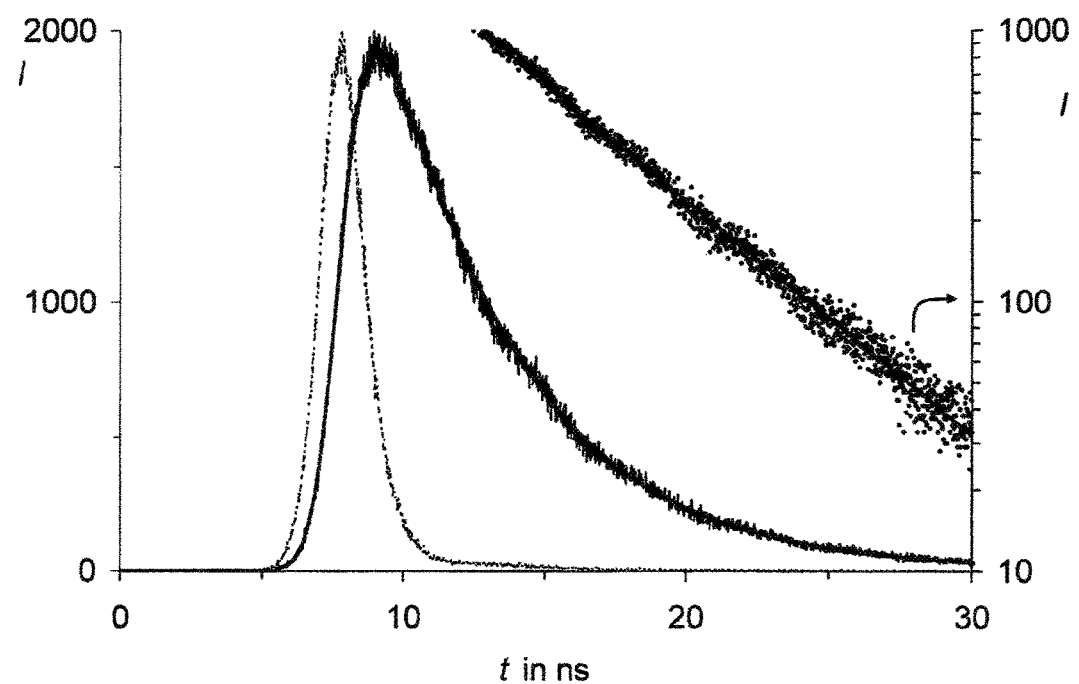

FIG. 10. Fluorescence decay behavior of S-13 (2) in Luran; fluorescence stimulation at 490 mm, detection at 573 nm. Dotted line: time-dependent intensity curve of the stimulation lamb. Solid, noisy curve: Time curve of the intrinsic fluorescence with deconvoluted function as Balancing curve (mostly covered by the Measured curve). On the right side: Detail of the fluorescence decay curve and balancing function with logarithmic scale.

Figure 11:
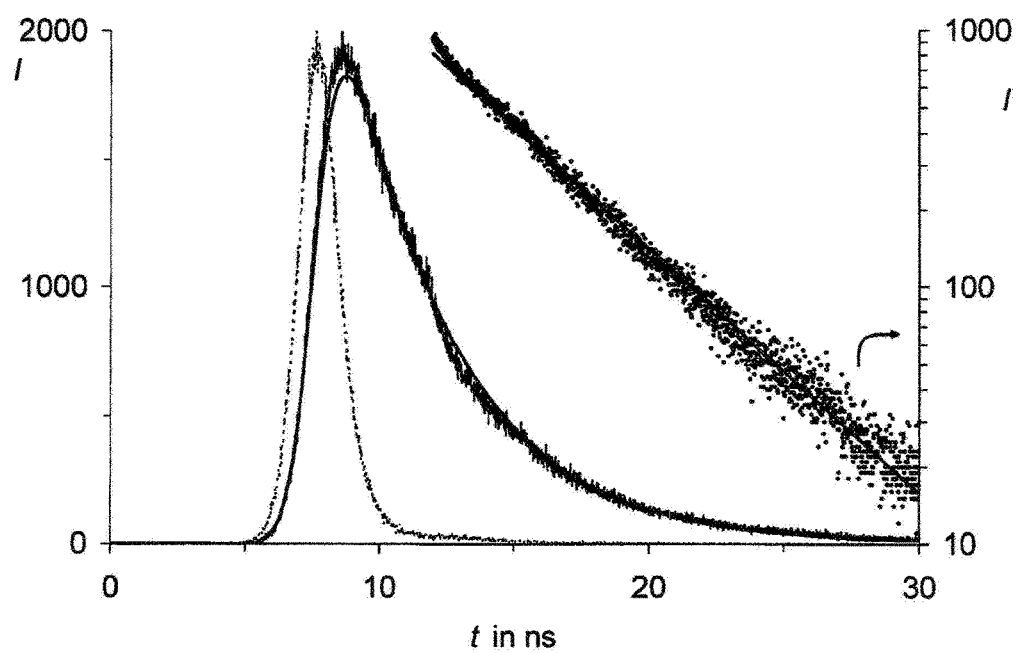

FIG. 11. Fluorescence decay behavior of S-13 (2) in Delrin; fluorescence stimulation at 490 mm, detection at 573 nm. Dotted line: time-dependent intensity curve of the stimulation lamb. Solid, noisy curve: Time curve of the intrinsic fluorescence with deconvoluted function as Balancing curve (mostly covered by the Measured curve). On the right side: Detail of the fluorescence decay curve and balancing function with logarithmic scale.

Figure 12:
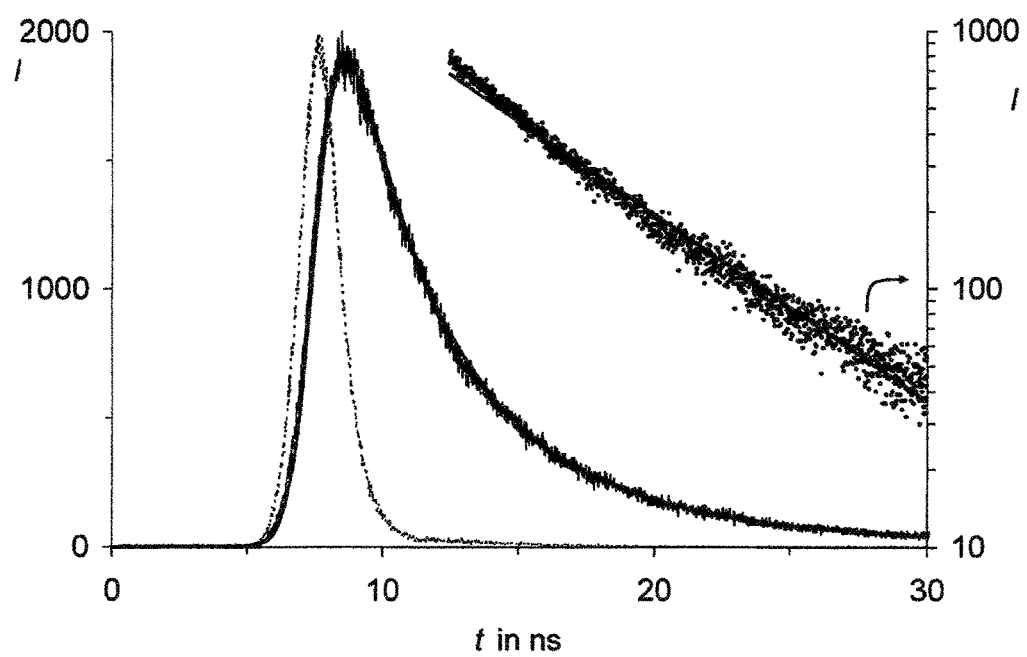

FIG. 12. Fluorescence decay behavior of S-13 (2) in Ultramid; fluorescence stimulation at 490 mm, detection at 573 nm. Dotted line: time-dependent intensity curve of the stimulation lamb.

Solid, noisy curve: Time curve of the intrinsic fluorescence with deconvoluted function as Balancing curve (mostly covered by the Measured curve). On the right side: Detail of the fluorescence decay curve and balancing function with logarithmic scale.

Figure 13:
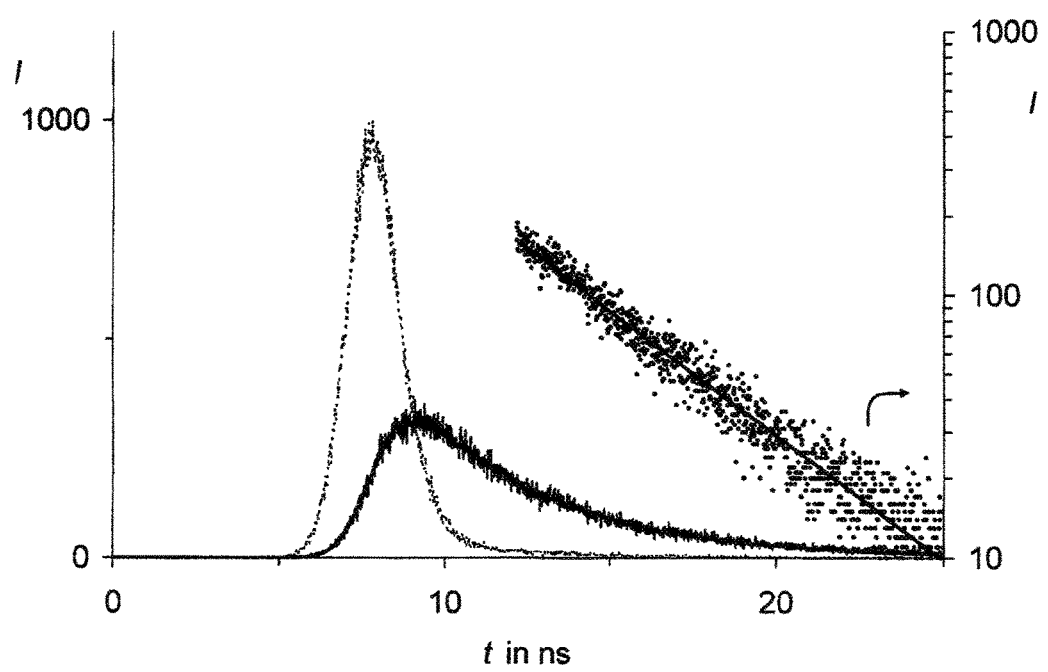

FIG. 13. Fluorescence decay behavior of the terrylene (3) in Luran; fluorescence stimulation at 490 mm, detection at 667 nm. Dotted line: time-dependent intensity curve of the stimulation lamb. Solid, noisy curve: Time curve of the intrinsic fluorescence with deconvoluted function as Balancing curve (mostly covered by the Measured curve). On the right side: Detail of the fluorescence decay curve and balancing function with logarithmic scale.

Figure 14:
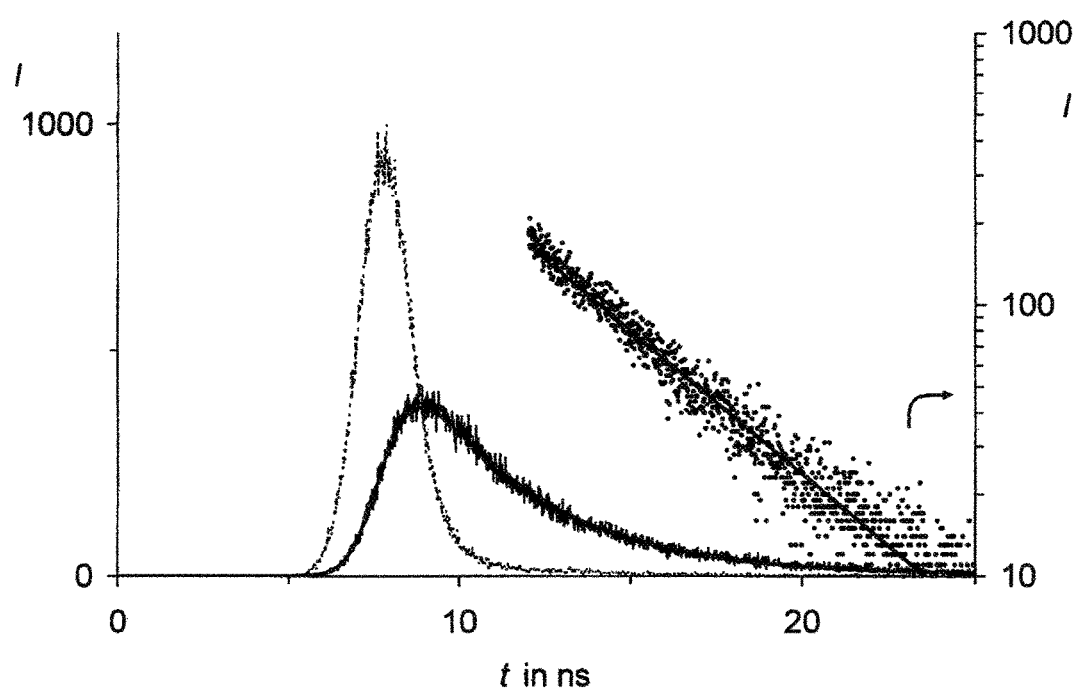

FIG. 14. Fluorescence decay behavior of terrylene (3) in Delrin; fluorescence stimulation at 490 mm, detection at 667 nm. Dotted line: time-dependent intensity curve of the stimulation lamb. Solid, noisy curve: Time curve of the intrinsic fluorescence with deconvoluted function as Balancing curve (mostly covered by the Measured curve). On the right side: Detail of the fluorescence decay curve and balancing function with logarithmic scale.

Figure 15:
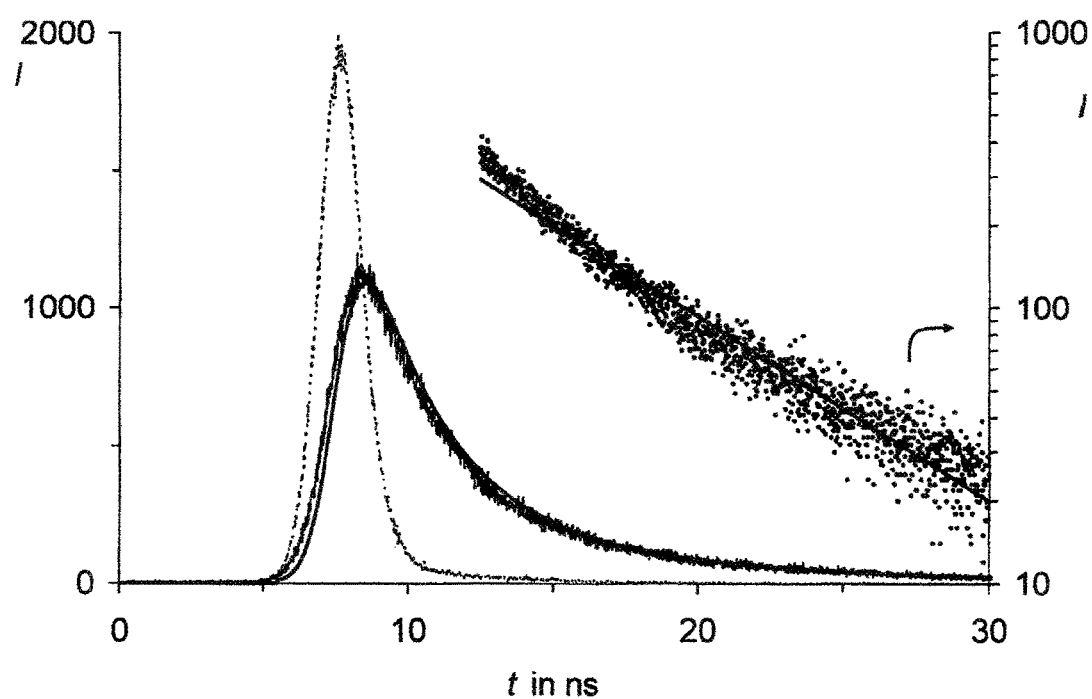

FIG. 15. Fluorescence decay behavior of terrylene (3) in Ultramid; fluorescence stimulation at 490 mm, detection at 667 nm. Dotted line: time-dependent intensity curve of the stimulation lamb. Solid, noisy curve: Time curve of the intrinsic fluorescence with deconvoluted function as Balancing curve (mostly covered by the Measured curve). On the right side: Detail of the fluorescence decay curve and balancing function with logarithmic scale.

DETAILED DESCRIPTION

Figure 1:
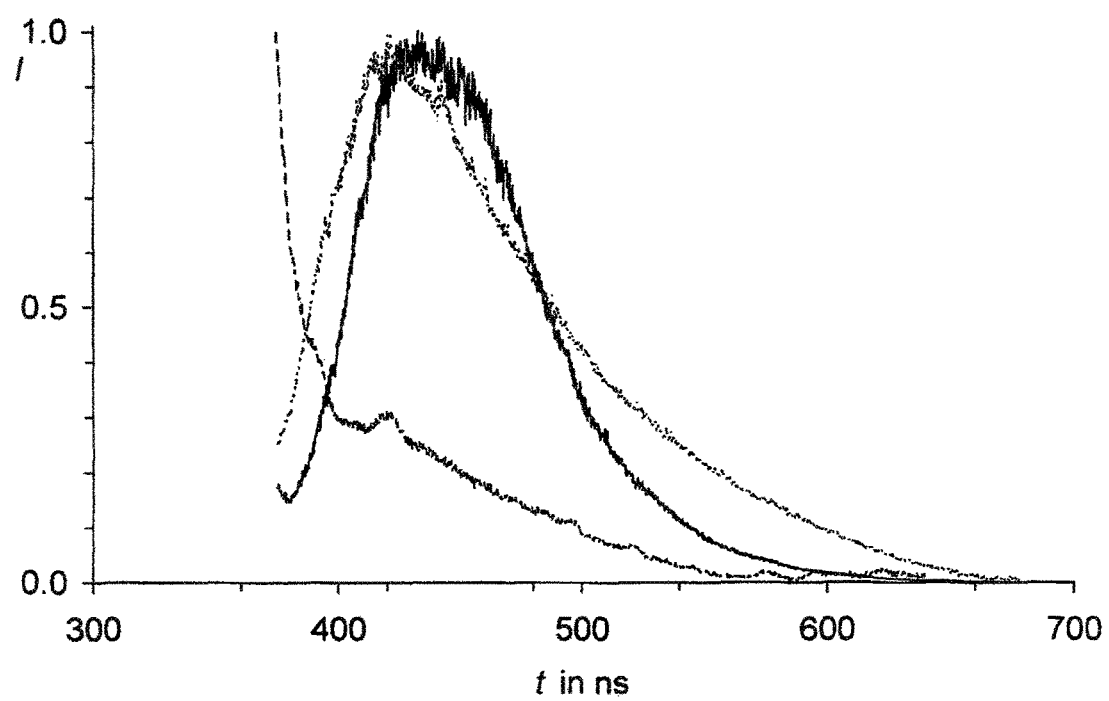
FIG. 1. Fluorescence spectra of polymer materials and the optical stimulation at 356 mm. Delrin: Dashed line, Luran; Dotted line. Ultramid: Solid line FIG. 2. Fluorescence decay behavior of Luran. Dotted line: time dependent intensity curve of the stimulation lamp. Solid, noisy curve: Time curve of the intrinsic fluorescence with deconvoluted function as Balancing curve (mostly covered by the Measured curve). On the right side: Detail of the fluorescence decay curve and balancing function with logarithmic scale.
Figure 2:
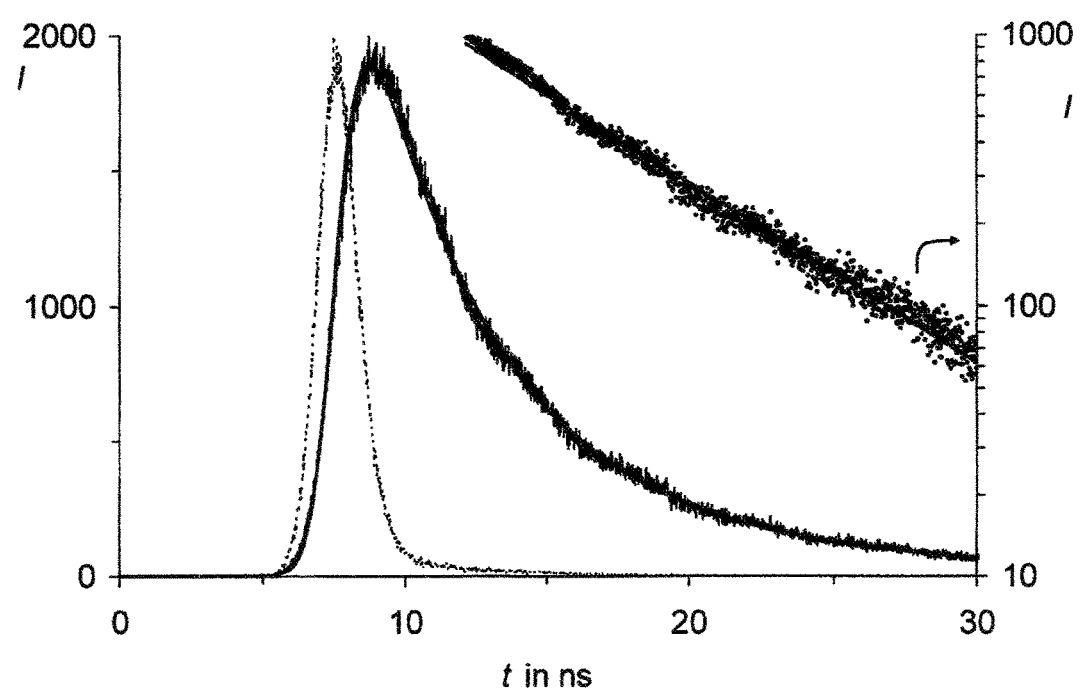
Figure 3:
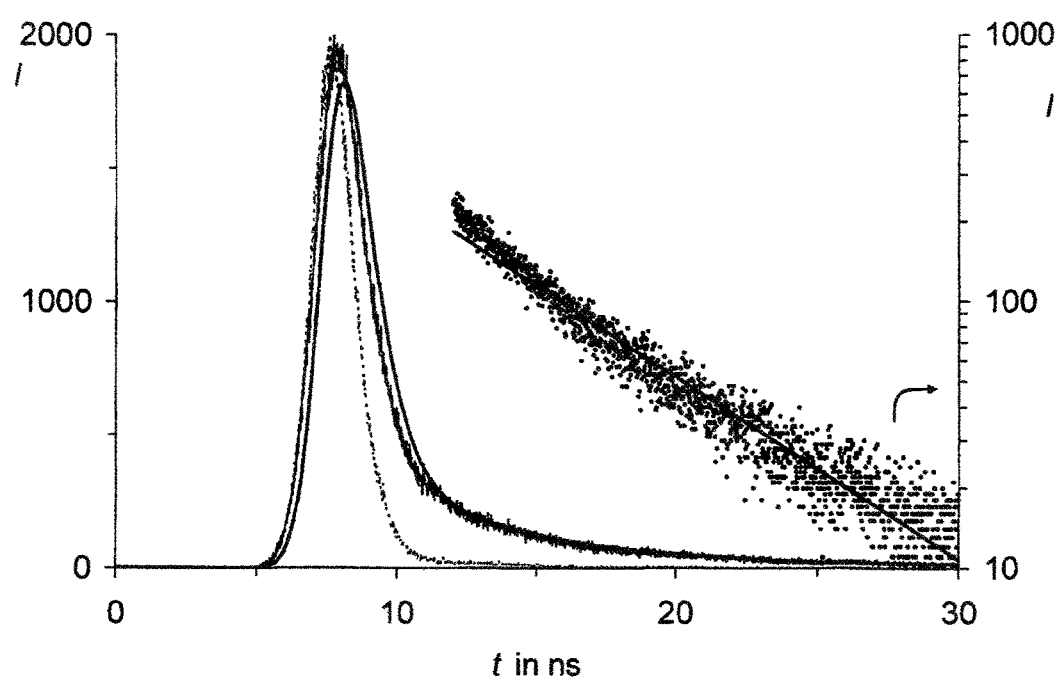
FIG. 3. Fluorescence decay behavior of Delrin. Dotted line: time dependent intensity curve of the stimulation lamp. solid, Noisy curve: Time curve of the intrinsic fluorescence with deconvoluted function as Balancing Curve (mostly covered by the Measured curve). On the right side: Detail of the fluorescence decay curve and balancing function with logarithmic scale.
Figure 4:
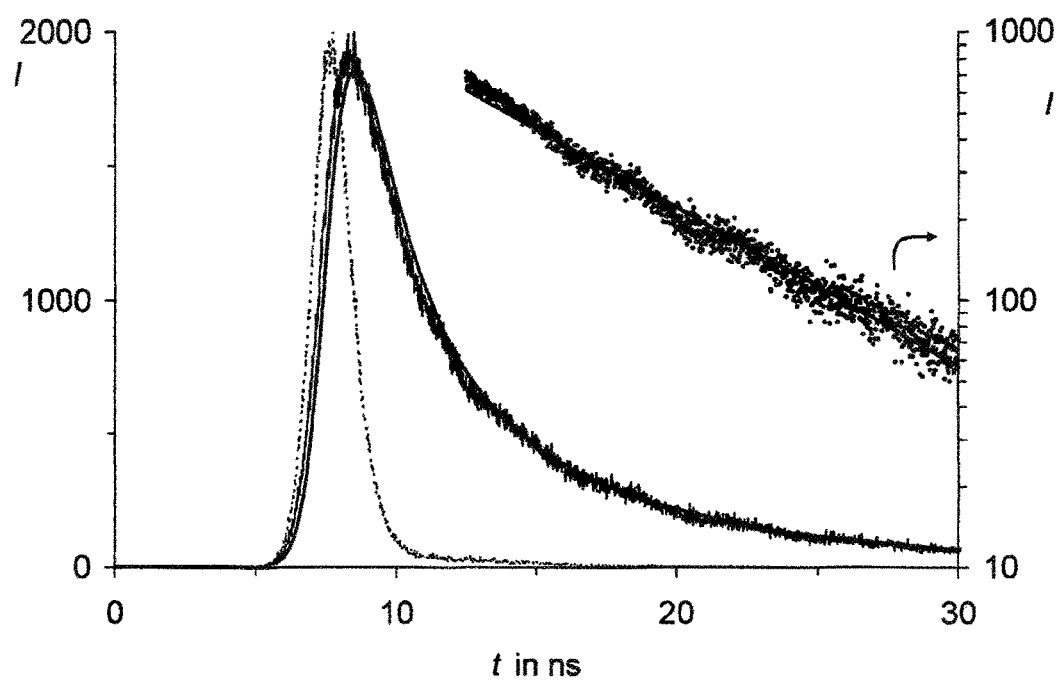
FIG. 4. Fluorescence decay behavior of Ultramid. Dotted line: time dependent intensity curve of the stimulation lamp. Solid, Noisy curve: Time curve of the intrinsic fluorescence with deconvoluted function as Balancing Curve (mostly covered by the Measured curve). On the right side: Detail of the fluorescence decay curve and balancing function with logarithmic scale.
Figure 5:
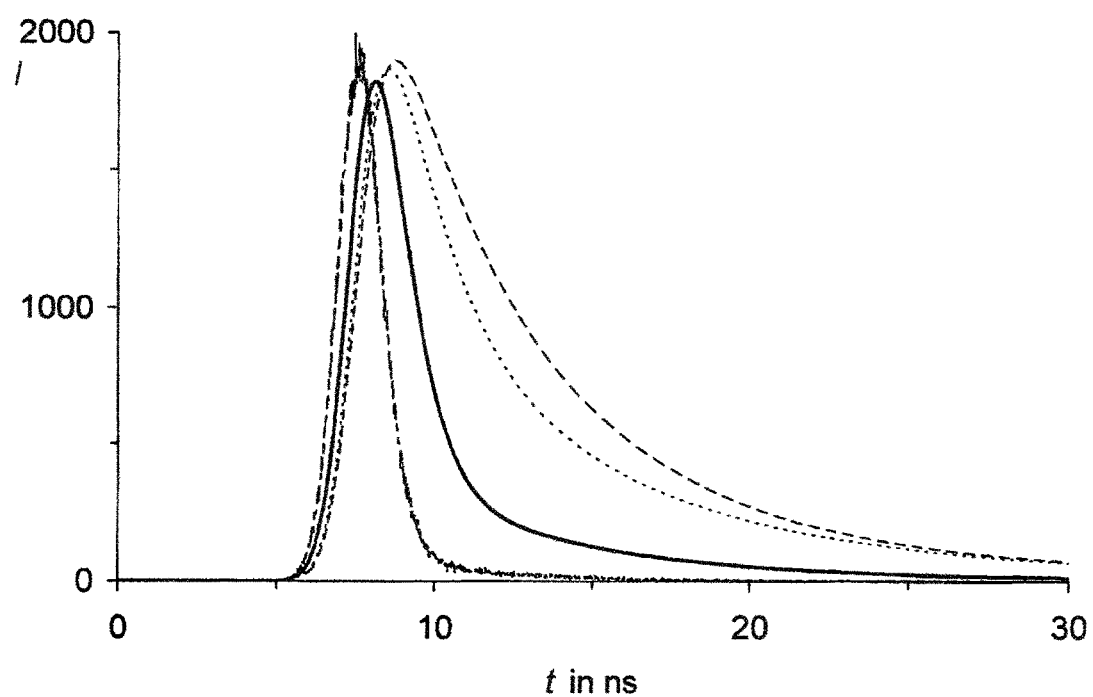
FIG. 5. Overview of the time-dependent intensity curve off the stimulation lamp parent open dotted line, left her in close. And from left to right the deconvoluted functions of Dehrin (solid line), Ultramid (Dotted line) and Luran (dashed line).

We have found that technical polymer raw materials (here as examples Luran, Dehrin and Ultramid) astonishingly show large intrinsic fluorescences if they are stimulated optically for example in the UV-region, in particular in the UVA-region, and also in the short-wave visual range; see FIG. 1. One can now try an identification via the intrinsic fluorescence spectra but would then still have the problem to sense the wavelength dependency of the fluorescence and provide an identification with that. We have found in contrast that the fluorescence decay time is astonishingly heavily dependent from the used materials; see FIGS. 2 to 4 and table 1. The time constant of the fluorescence decay time can be used as "fingerprint" of the respective polymer material; the time constant is only slightly dependent of the stimulating wavelength; see FIG. 5. Preferably the optical stimulation is performed in the UVA region with any light sources, preferably in the range of 365 nm; here are of interest the mercury vapor discharge lamp line at 365 mm or the hydrogen-Balmer lines at 397, 389 and 384 nm or the overtones of neodym YAG-laser, like for example at 355 nm or also light emissions of various semiconductor lasers (for example based on gallium-nitride), which are provided in wavelength ranges up to for example 405 nm and which suit very well as pulsed light sources. One obtains with the fluorescence stimulation at 365 mm for example by detecting at 573 mm (this wavelength is preferred because one can cover a plurality of plastics and markers) for the technical plastics Ultramid 1.96 ns, for Delrin 0.74 ns and for Luran 3.53 ns decay time (the short time component is preferred which can be distinguished very well and which enables therefore a high detection reliability); see table 1.

Since the fluorescence decay curves can be in general described exactly with exponential functions, a similar procedure for the detection of various polymer materials is possible. It is not required at all to capture the complete exponential curve but rather two punctual or also integrated intensity measurements [5] (cumulation—summation—of single measurements, each over a defined time period) at different times are more than sufficient. When having a bi-exponential curve one requires three intensity measurements, if having pure plastics however the mono-exponential parts are relevant.

TABLE 1 fluorescent decay times of pure polymers, markers In a Chloroform-solution and of the doped polymers.

| Probe | $\tau$ in ns[a] | $\tau_{bi}$ in ns[b] | $\lambda_{ex}$[c] | $\lambda_{em}$[d] |
|---|---|---|---|---|
| Delrin | 0.74[e] | 5.78 | 365 | 573 |
| Luran | 3.53[e] | 8.42 | 365 | 573 |
| Ultramid | 1.96[e] | 7.83 | 365 | 573 |
| Ester 1 in CHCl$_3$ | 3.53 | | 442 | 485 |
| S-13 (2) in CHCl$_3$ | 4.06 | | 490 | 573 |
| Terrylen 3 in CHCl$_3$ | 3.66 | | 598 | 687 |
| Delrin-Ester (1) | 3.90 | | 442 | 485 |
| Delrin-Ester (1) | 3.92 | | 490 | 573 |
| Delrin-S-13 (2) | 3.74 | | 490 | 573 |
| Delrin-Terrylen (3) | 3.31 | | 598 | 667 |
| Delrin-Terrylen (3) | 3.34 | | 490 | 667 |

TABLE 1-continued fluorescent decay times of pure polymers, markers In a Chloroform-solution and of the doped polymers.

| Probe | τ in ns[a] | τ$_{bi}$ in ns[b] | λ$_{ex}$[c] | λ$_{em}$[d] |
|---|---|---|---|---|
| Luran-Ester (1) | 4.08 | | 490 | 573 |
| Loran-S-13 (2) | 4.56 | | 490 | 573 |
| Luran-Terrylen (3) | 3.53 | | 598 | 667 |
| Luran-Terrylen (3) | 3.96 | | 490 | 667 |
| Ultramid-Ester (1) | 2.44[e] | 7.53 | 442 | 485 |
| Ultramid-Ester (1) | 2.26[e] | 5.75 | 490 | 573 |
| Ultramid-S-13 (2) | 1.83[e] | 5.37 | 490 | 573 |
| Ultramid-Terrylen (3) | 2.34[e] | 6.98 | 598 | 667 |

[a]fluorescence decay constant;
[b]additional bi-exponential part;
[c]stimulating wavelength in nm;
[d]detection wavelength in nm;
[e]evaluated bi-exponentially.

Integration over each defined time period, preferably a measurement before the first half-value period and a measurement after the first half-value period is in particular advantageously because the signal-to-noise-ratio can be significantly enhanced (the fluorescent light of the probe is used more efficiently). Starting from the usual fluorescence decay times of approximately 5 ns, then this requires two measurements in time distance of 1 to 2 ns with integration times of also approximately 1 to 2 ns. Measurements with such a time resolution do not pose a problem electronically, however the measurement procedure can be further simplified by stimulating the plastic probe not only once but periodically. It is assumed that after approximately ten half-value periods the optical stimulation is reduced to such an extent that another stimulation can be carried out undisturbed; when starting from an unfavorable case having 10 ns fluorescence decay time this is achieved after approximately 70 ns. One can optically stimulate the probe periodically with a pulse sequence of 70 ns, therefore with repeating frequency of approximately 15 MHz. The two measurements for the determination of the fluorescence decay times then do not need to have to lie within single decay time, but can lie within two subsequent pulses and the requirements for the electronic components for the evaluation are further lowered.

TABLE 2

Test for reproducibility of the measurement of fluorescent decay times and the method by repetition of single tests by differently shaked and therefore differently oriented granulate probes respectively.

| Probe | τ in ns[a] | τ$_m$, in s[b] | λ$_{ex}$[c] | λ$_{em}$[d] |
|---|---|---|---|---|
| Delrin-Ester (1) | 3.92 | | 442 | 485 |
| Delrin-Ester (1) | 3.91 | | 442 | 485 |
| Delrin-Ester (1) | 3.95 | | 442 | 485 |
| Delrin-Ester (1) | 3.91 | | 442 | 485 |
| Delrin-Ester (1) | 3.90 | 3.92, 0.02 | 442 | 485 |
| Delrin-S-13 (2) | 3.78 | | 490 | 573 |
| Delrin-S-13 (2) | 3.77 | | 490 | 573 |
| Delrin-S-13 (2) | 3.79 | | 490 | 573 |
| Delrin-S-13 (2) | 3.79 | | 490 | 573 |
| Delrin-S-13 (2) | 3.73 | | 490 | 573 |
| Delrin-S-13 (2) | 3.74 | 3.77, 0.03 | 490 | 573 |
| Delrin-Terrylen (3) | 3.35 | | 598 | 667 |
| Delrin-Terrylen (3) | 3.45 | | 598 | 667 |
| Delrin-Terrylen (3) | 3.31 | 3.37, 0.07 | 598 | 667 |
| Luran-S-13 (2) | 4.55 | | 490 | 573 |
| Luran-S-13 (2) | 4.56 | | 490 | 573 |
| Luran-S-13 (2) | 4.43 | 4.51, 0.07 | 490 | 573 |
| Ultramid-Ester (1) | 2.43 | | 442 | 485 |
| Ultramid-Ester (1) | 2.44 | 2.44 | 442 | 485 |

[a]Fluorescence decay constant;
[b]Average, standard deviation s;
[c]Stimulating wavelength in nanometers;
[d]Detection wavelength in nanometers.

More productive is the measurement with a fluorescence decay process by detecting the two required integrated signals with periodic stimulation in that is time-shifted and triggered by the stimulating pulse; here a separation can be performed, for instance with two parallel running phase-sensitive detectors (PSD) with which the intensities are measured integrating over two different time ranges of the decay curve. Finally it is not required to determine the absolute decay time, because device specific raw data can be used as long as they are sufficiently reproducible; for all used devices a very good reproducibility of the measured values and also of the raw data (for instance not corrected by deconvolution) was obtained. There have been found very small standard deviations s of 0.02 to 0.07 nanoseconds, which document a clear discrimination between various probes; see table 2. The method is significantly further simplified because of the unproblematic use also of raw data.

When considering, that a recycling-flake is in the worst case of a maximum size of 10 mm and for reliability reasons a distance of 20 mm is imposed between two flakes then at 15 MHz pulse sequence and a form feed velocity of 500 m/s (because of technology reasons one should stay below the velocity of sound) more than 200 stimulating pulses per flake are provided. When averaging these one can enhance the signal-to-noise-ratio significantly and the detection reliability can be further increased. Assuming a mass of 25 mg for a recycling-flake (the value was obtained by averaging flakes from commercially available technical recycling material), one can sort 1.5 tons of material per hour with a sorting line. This can be regarded as a realistic technological continuous sorting power, which can be managed by the described detection method. In many cases such high sorting power is not required; when requiring small sorting power, requirements of electronics and mechanics are significantly lower.

The method described here uses the intrinsic fluorescence of the materials. One can dope the polymer materials additionally with fluorescence markers; When having dope concentrations below 0.02 ppm the markers are invisible for the human eye. Markers require a minimum of light fastness; when shredding plastics prior to the detection, this is not a serious problem because of the formation of fresh areas of fracture. For light fastened fluorescence dyes perylene derivatives and other peri-arylenes, like for example 1 to 3 can be used; for the UV/VIS-absorption- and fluorescence spectra in chloroform-solution see FIG. 6.

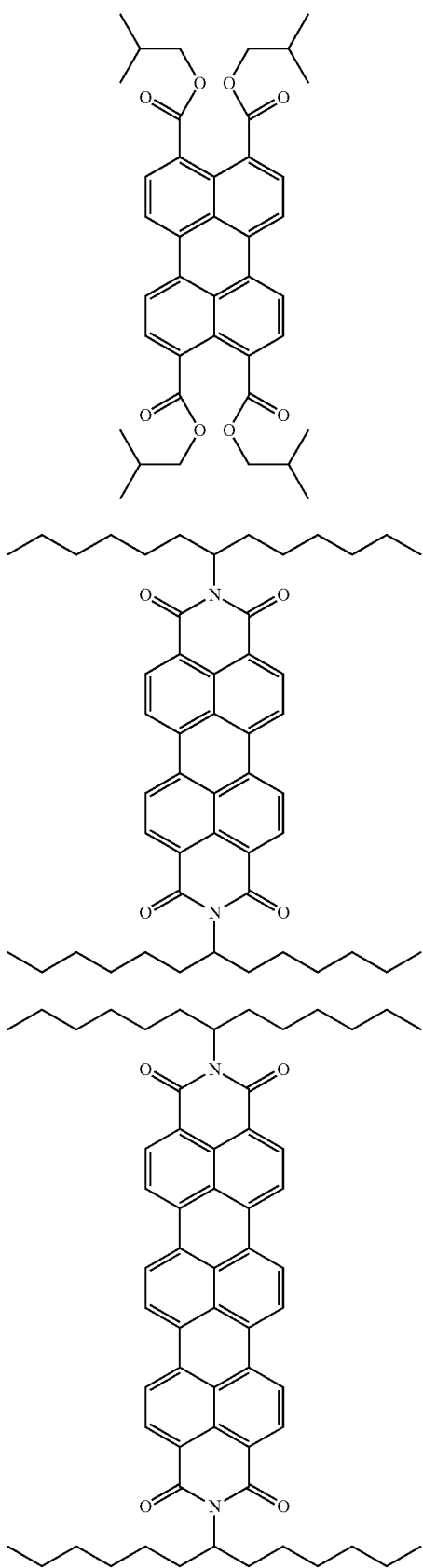

Figure 6:
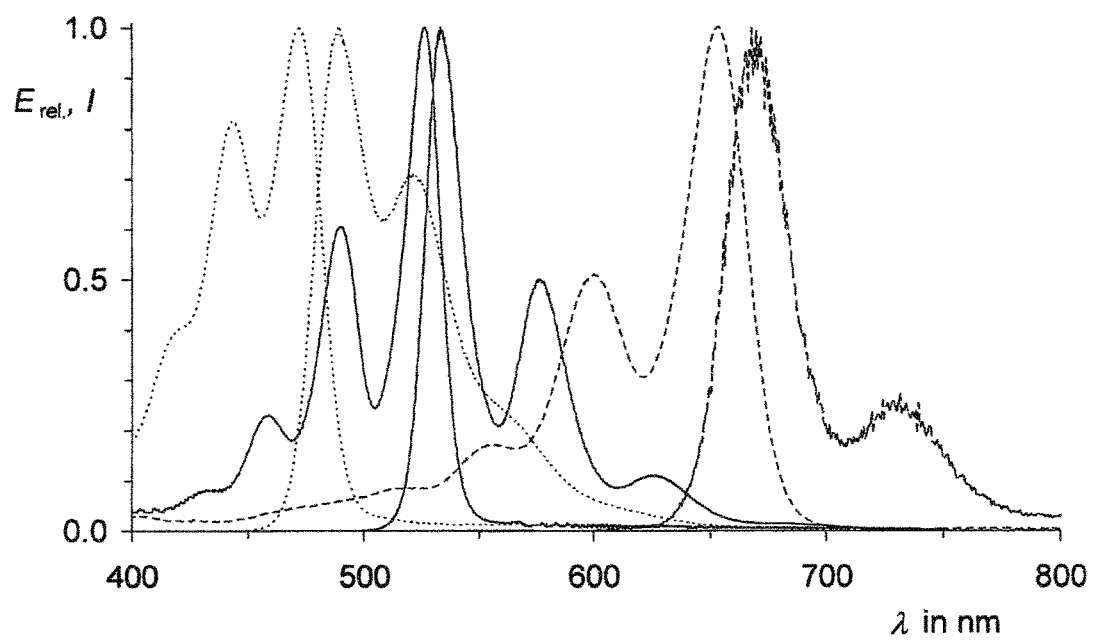
FIG. 6. from left to right: UV/VIS—absorption—(each on the left) and fluorescence spectra (each on the right) of perylene ester 1 (buttons), the peryleneimide 2 (solid) and of terryleneimide 3 (best) in chloroform.
Figure 7:
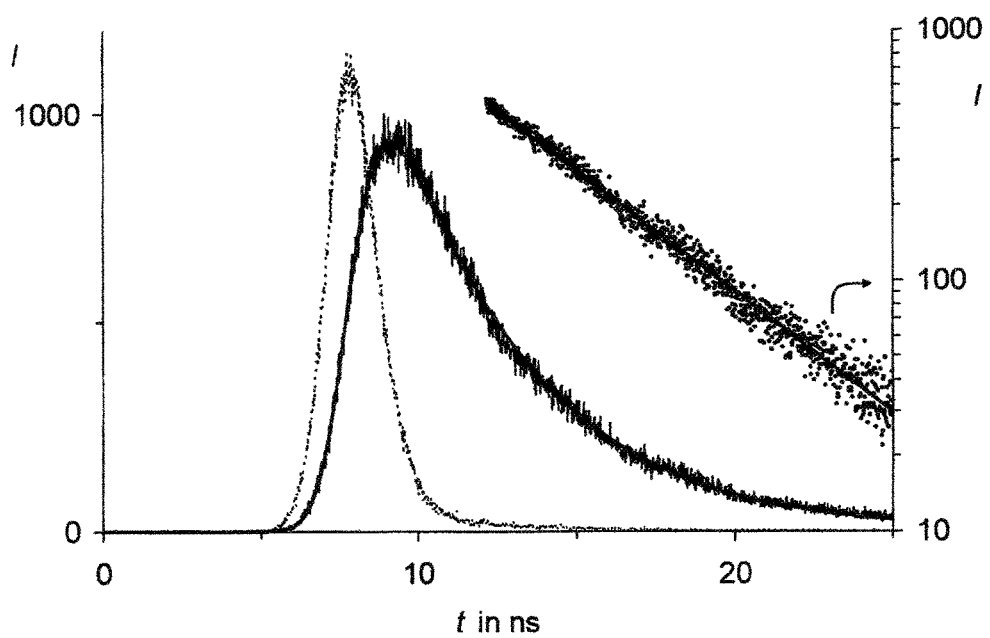

We have used as short-wave, visual fluorescing perylene derivate the perylene tetracarboxylictetraisobutylester 1 [6], for middle-wave wavelengths the bisimide 2 [7] and for longer wavelengths the terrylene derivative 3 [8]—see FIG. 12—, which are very different in their fluorescence spectra—see FIG. 6—, and we have therefore achieved an astonishingly clear additional marking option. When irradiating with a shorter wavelength into the marked materials, therefore for example at 365 nm, but also up to 405 nm, then one obtains the intrinsic fluorescence of the polymer. At 365 nm no dye will be practically optically stimulated and we have experimentally nearly only found the dominant intrinsic fluorescence of the polymeric materials; the fluorescence of the markers is negligible. When irradiating with a longer wavelength into the long wavelength absorption spectra of the dyes—here one can use also 490 nm for all marker dyes—then one only founds practically the fluorescence of the markers. This is technologically interesting, because one can identify in this way the polymer basic material by stimulating it with a short wavelength via its intrinsic fluorescence and then to sort particular charges via the fluorescence of added markers (for instance 1 to 3). Since the markers provide fluorescence in well distinctable spectral ranges, a plurality of markers can be simultaneously present and independently of each other be detected. The coding of the charges can therefore be also provided binary for example by the presence of one marker or another or also both, etc. Therefore one obtains $2^n-1$ coding possibilities with n markers (if undoped material is not considered). In this concrete case one obtains seven coding possibilities, which can correlate to seven distinctive charges of the respective polymers. Here the differentiation of the markers is performed based on the fluorescence wavelengths. Moreover the markers can be distinguished also in their fluorescence decay times, which are characteristic for each marker-polymer combination; See FIG. 7 to 15. One can therefore either sort based on wavelengths or based on fluorescence decay times. When using both criteria one obtains a redundancy which further enhances the sorting reliability; this can obtain a particular meaning for a special charges of high-quality materials. Finally one can dope undoped materials afterwards with fluorescence dyes, for instance by diffusing from the liquid phase or via the gas phase or also via melting processes; with that, for instance by redundancy, sorting reliability can be in particular significantly enhanced for recycling materials.

The describes method here has been primarily developed for the recycling of plastics, it can however be used in general for instance manifold marking purposes, for example by replacing a barcode or QR-code markings; for the latter usually optically readable markings are required whereas fluorescence decay times can be determined also from arbitrarily light scattering objects. The marking can be attached hidden or partially hidden and can therefore for instance be used as a marking against product counterfeiting. When introducing the marker into plastics of a plastic bottle a particular reliability regarding their identification can be obtained since neither the label nor the Inscription are necessary, which can be lost.

CONCLUSION

Using the fluorescence decay time of the intrinsic fluorescence polymer materials can be clearly identified and in this way can be sorted in a completely separated manner automatically. Because of the high velocity of the detection process possibilities for sorting devices with high material throughput are opened. Because of the use of phase-sensitive detectors and integrative measurements electronic costs for detection units are beneficial. Furthermore the polymer materials can be marked for their detection with fluorescence dyes, like for example perylene ester, peryleneimides, and terryleneimides, which are detected in different spectral regions via their fluorescence, or also via their individual fluorescence decay times in various polymer materials. Due to a binary combination of the marker a multiplication of the detection possibilities is provided. The identification can be realized via their spectral regions as well as via their individual decay times in that respective polymers.

LITERATURE

[1] (a) E. Nemeth, G. Schubert, V. Albrecht, F. Simon, Aufbereitungs Tech. 2005, 46, 35-46. (b) E. Nemeth, F. Simon, V. Albrecht, G. Schubert, Ger. Patent (2006), DE 102004024754 B3 (12 May 2004); Chem. Abstr. 2006, 144, 392348. (d) U. Gohs, V. Albrecht, K. Husemann, E. Reinsch, R. Schuenemann, F. Simon, Ger. Offen. (2009), DE 102007055765 A1 (11 Dec. 2007); Chem. Abstr. 2009, 151:57663.

[2] H. Langhals, T. Schmid, M. Herman, M. Zwiener, A. Hofer, Int. J. Environm. Engin. Sci. Technol. Res. 2013, 7, 124-132.

[3] (a) H. Langhals, T. Schmid, M. Herman, M. Zwiener, A. Hofer, Ger. Offen. DE 1020120127723 (22 Jun. 2012). (b) General Electric (Erf. S. Hubbard, R. Potyrailo, P. Schottland, V. Thomas), US-Pat. 2005/0095715 (5 May 2005).

[4] H. Langhals, T. Schmid, M. Herman, M. Zwiener, A. Hofer, Ger. Ojfen. DE 1020120127723 (Jun. 22, 2012); Chem. Abstr. 2013, 160, 63983.

[5] (a) R. M. Ballew, J. N. Demas, Anal. Chem. 1989, 61, 30-33. (b) R. J. Woods, S. Scypinski, L. J. Cline Love, H. A. Ashworth, Anal. Chem. 1984, 56, 1395-1400. (c) R. J. Meier, L. H. Fischer, O. S. Wolfbeis, M. Schäferling, Sensors and Actuators B 2013, 177, 500-506.

[6] S. Alibert-Fouet, 1. Seguy, J.-F. Bobo, P. Destruel, H. Bock, Chem. Europ. J. 2007, 13, 1746-1753.

[7] S. Demmig, H. Langhals, Chem. Ber. 1988, 121, 225-230.

[8] (a) H. Langhals, S. Poxleitner, Eur. J. Org. Chem. 2008, 797-800. (b) H. Langhals, A. Walter, E. Rosenbaum, L. B.-A. Johansson, Phys. Chem. Chem. Phys. 2011, 13, 11055-11059.

The invention claimed is:

1. A method for detecting polymers comprising:
   determining individual fluorescence decay times of intrinsic fluorescences of dye-free plastics;
   identifying the dye-free plastics based on the decay times of the intrinsic fluorescences of the dye-free plastics; and
   separating the identified dye-free plastics.

2. The method of claim 1 wherein the separating comprises sorting the identified dye-free plastics in a completely separated manner.

3. The method of claim 1 wherein pulsed light sources are used for fluorescence stimulation.

4. The method of claim 1 wherein pulsed light sources are used for fluorescence stimulation, said light sources being at least one of laser diodes, light diodes, gallium nitride lamps, and gas discharge lamps.

5. The method of claim 1 wherein said dye-free plastics are detected with phase-sensitive detectors.

6. The method of claim 1 further comprising using a fluorescence decay time for detecting dye-free plastics by stimulating fluorescence with periodic pulsed light sources and accumulating and averaging a fluorescence signal.

7. The method of claim 1:
   wherein the separating provides a sorted separation in a completely separated manner for recycling; and
   wherein the dye-free plastics comprise a material comprising at least one of thermoplastics, polyoxymethylene (POM), polystyrene (PS), polyamide (PA), polyethylene terephthalate (PET), polycarbonates (PC), polyethylene (PE), polypropylene (PP), polyvinyl chloride (PVC), polyetherketone (PEK), aramids, KAPTON® (polyimide), and polysulfone.

\* \* \* \* \*